United States Patent
Xiao et al.

(10) Patent No.: US 10,128,481 B2
(45) Date of Patent: Nov. 13, 2018

(54) LITHIUM-BASED BATTERY SEPARATOR AND METHOD FOR MAKING THE SAME

(71) Applicant: GM GLOBAL TECHNOLOGY OPERATIONS LLC, Detroit, MI (US)

(72) Inventors: Qiangfeng Xiao, Troy, MI (US); Anne M. Dailly, West Bloomfield, MI (US); Li Yang, Troy, MI (US); Zhongyi Liu, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 288 days.

(21) Appl. No.: 14/617,322

(22) Filed: Feb. 9, 2015

(65) Prior Publication Data
US 2015/0236324 A1   Aug. 20, 2015

Related U.S. Application Data

(60) Provisional application No. 61/941,054, filed on Feb. 18, 2014.

(51) Int. Cl.
  *H01M 2/16* (2006.01)
  *H01M 10/052* (2010.01)
  *H01M 2/14* (2006.01)

(52) U.S. Cl.
  CPC ......... *H01M 2/1686* (2013.01); *H01M 2/145* (2013.01); *H01M 2/1653* (2013.01); *H01M 10/052* (2013.01)

(58) Field of Classification Search
  CPC .. H01M 2/1686; H01M 2/145; H01M 2/1653; H01M 10/052; Y02E 60/122
  See application file for complete search history.

(56) References Cited

U.S. PATENT DOCUMENTS

| | | | |
|---|---|---|---|
| 6,110,619 A | 8/2000 | Zhang et al. | |
| 6,312,853 B1 | 11/2001 | Zhang et al. | |
| 6,652,440 B1 * | 11/2003 | Kovalev | C08G 75/14 525/279 |
| 8,663,840 B2 | 3/2014 | Nazri et al. | |
| 8,974,946 B2 | 3/2015 | Cai et al. | |
| 8,999,584 B2 | 4/2015 | Jiang et al. | |
| 9,028,565 B2 | 5/2015 | Huang | |

(Continued)

FOREIGN PATENT DOCUMENTS

| CN | 1285085 A | 2/2001 |
|---|---|---|
| CN | 103490027 A | 1/2014 |

(Continued)

OTHER PUBLICATIONS

Shijun Ji et al. (CN 101913862 A) translation.*
Pehlivan, Ilknur Bayrak, et al. "PEI-LiTFSI electrolytes for electrochromic devices: Characterization by differential scanning calorimetry and viscosity measurements." Solar Energy Materials and Solar Cells 94.12 (2010): 2399-2404.*

(Continued)

*Primary Examiner* — Sarah A. Slifka
(74) *Attorney, Agent, or Firm* — Harness, Dickey & Pierce, P.L.C.

(57) ABSTRACT

A lithium-based battery separator includes a porous polymer membrane having opposed surfaces. A porous carbon coating is formed on one of the opposed surfaces of the porous polymer membrane. Polycations are incorporated in the porous carbon coating, in the porous polymer membrane, or in both the porous carbon coating and the porous polymer membrane.

16 Claims, 6 Drawing Sheets

(56) References Cited

U.S. PATENT DOCUMENTS

| | | | |
|---|---|---|---|
| 9,093,705 B2 | 7/2015 | Xiao et al. | |
| 9,123,939 B2 | 9/2015 | Xiao et al. | |
| 9,142,830 B2 | 9/2015 | Xiao et al. | |
| 9,153,819 B2 | 10/2015 | Huang et al. | |
| 9,160,036 B2 | 10/2015 | Yang et al. | |
| 9,350,046 B2 | 5/2016 | Huang | |
| 9,362,551 B2 | 6/2016 | Sachdev et al. | |
| 9,362,552 B2 | 6/2016 | Sohn et al. | |
| 9,406,932 B2 | 8/2016 | Li et al. | |
| 9,412,986 B2 | 8/2016 | Huang | |
| 9,537,144 B2 | 1/2017 | Huang et al. | |
| 2006/0062982 A1* | 3/2006 | Hammond Cunningham | B01D 69/02 428/220 |
| 2009/0178969 A1* | 7/2009 | Hanakawa | B01D 67/0006 210/321.6 |
| 2012/0231321 A1 | 9/2012 | Huang et al. | |
| 2013/0260207 A1* | 10/2013 | Uemura | H01M 2/16 429/144 |
| 2013/0284338 A1 | 10/2013 | Xiao et al. | |
| 2013/0309572 A1* | 11/2013 | Zhang; Shengshui | H01M 4/13 429/217 |
| 2014/0272558 A1 | 9/2014 | Xiao et al. | |
| 2015/0200393 A1* | 7/2015 | Li | H01M 4/383 429/199 |
| 2015/0328593 A1* | 11/2015 | Kojima | B01D 71/34 210/489 |
| 2016/0111721 A1 | 4/2016 | Xiao et al. | |

FOREIGN PATENT DOCUMENTS

| | | | | |
|---|---|---|---|---|
| CN | 104852005 A | 8/2015 | | |
| DE | 102015102089 A1 | 8/2015 | | |
| WO | WO 2010035001 A1 * | 4/2010 | | A61K 47/26 |

OTHER PUBLICATIONS

Xie, Zhong, et al. "Functionally graded cathode catalyst layers for polymer electrolyte fuel cells II. Experimental study of the effect of nafion distribution." Journal of the Electrochemical Society 152.6 (2005): A1171-A1179.*

Boccaccini, Aldo R., Omer van der Biest, and Jan B. Talbot. "Electrophoretic Deposition, Fundamentals and Applications: Proceedings of the International Symposium." The Electrochemical Society, 2002 (pp. 42-43).*

Su, Yu-Sheng, and Arumugam Manthiram. "Lithium—sulphur batteries with a microporous carbon paper as a bifunctional interlayer." Nature communications 3 (2012): 1166.*

Bucur, Claudiu B., et al. "Ultrathin tunable ion conducting nanomembranes for encapsulation of sulfur cathodes." Energy & Environmental Science 6.11 (2013): 3286-3290.*

Tang, Haolin, et al. "Porosity-graded micro-porous layers for polymer electrolyte membrane fuel cells." Journal of Power Sources 166.1 (2007): 41-46.*

Pehlivan, Ilknur Bayrak, et al. "Ion conduction of branched polyethyleneimine-lithium bis (trifluoromethylsulfonyl) imide electrolytes." Electrochimica Acta 57 (2011): 201-206.*

Wang, Lina, and Hye Ryung Byon. "N-Methyl-N-propylpiperidinium bis (trifluoromethanesulfonyl) imide-based organic electrolyte for high performance lithium-sulfur batteries." Journal of Power Sources 236 (2013): 207-214. (Year: 2013).*

Pehlivan, Ilknur Bayrak, et al. "Ionic relaxation in polyethyleneimine-lithium bis (trifluoromethylsulfonyl) imide polymer electrolytes." Journal of Applied Physics 108.7 (2010): 074102. (Year: 2010).*

Second Office Action for Chinese Application No. 201510161423.6 with English translation dated May 4, 2017; 13 pages.

Third Office Action for Chinese Application No. 201510161423.6 with English translation dated Nov. 14, 2017; 14 pages.

* cited by examiner

LITHIUM-BASED BATTERY SEPARATOR AND METHOD FOR MAKING THE SAME

CROSS-REFERENCE TO RELATED APPLICATIONS

This application claims the benefit of U.S. Provisional Patent Application Ser. No. 61/941,054, filed Feb. 18, 2014, which is incorporated by reference herein in its entirety.

BACKGROUND

Secondary, or rechargeable, lithium-sulfur batteries or lithium ion batteries are often used in many stationary and portable devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

A lithium-based battery separator includes a porous polymer membrane having opposed surfaces. A porous carbon coating is formed on one of the opposed surfaces of the porous polymer membrane. Polycations are incorporated in the porous carbon coating, in the porous polymer membrane, or in both the porous carbon coating and the porous polymer membrane.

Examples of the lithium-based battery separator disclosed herein may be included in a separator for a lithium ion battery or a lithium-sulfur battery.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
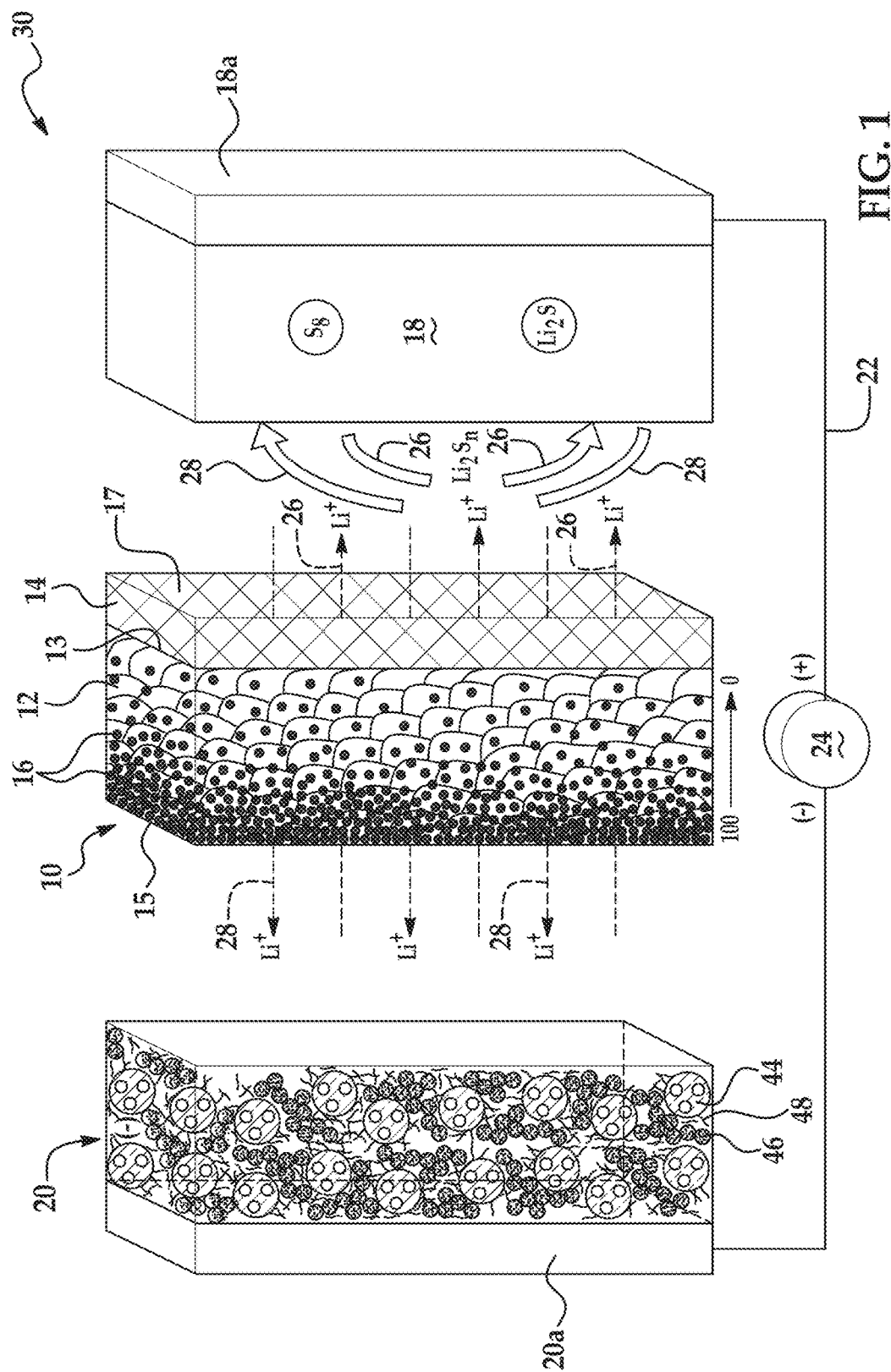
FIG. 1 is a schematic, perspective view of one example of a lithium-sulfur battery showing a charging and discharging state, the battery including one example of the separator according to the present disclosure.

Lithium-sulfur and lithium ion batteries generally operate by reversibly passing lithium ions between a negative electrode (sometimes called an anode) and a sulfur-based or lithium-based positive electrode (sometimes called a cathode). The negative and positive electrodes are situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes.

For a lithium-sulfur battery, the life cycle may be limited by the relatively poor conductivity of sulfur, and by the migration, diffusion, or shuttling of lithium-polysulfide intermediates ($LiS_x$, where x is 2<x<8) from the sulfur-based positive electrode during the battery discharge process, through the porous polymer separator, to the negative electrode. The lithium-polysulfide intermediates generated at the sulfur-based positive electrode are soluble in the electrolyte, and can migrate to the negative electrode where they react with the negative electrode in a parasitic fashion to generate lower-order lithium-polysulfide intermediates. These lower-order lithium-polysulfide intermediates diffuse back to the cathode and regenerate the higher forms of lithium-polysulfide intermediates. As a result, a shuttle effect takes place. This effect leads to decreased sulfur utilization, self-discharge, poor cycleability, and reduced Coulombic efficiency of the battery. Even a small amount of lithium-polysulfide intermediates forms an insoluble molecule, such as dilithium sulfide ($Li_2S$), which can permanently bond to the negative electrode. This may lead to parasitic loss of active lithium at the negative electrode, which prevents reversible electrode operation and reduces the useful life of the lithium-sulfur battery.

In addition, it has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning". In one example, a graphite electrode is poisoned by $Mn^{+2}$, $Mn^{+3}$, or $Mn^{+4}$ cations that dissolve from spinel $Li_xMn_2O_4$ of the positive electrode. For instance, the $Mn^{+2}$ cations may migrate through the battery electrolyte, and deposit onto the graphite electrode. When deposited onto the graphite, the $Mn^{+2}$ cations become Mn metal. It has been shown that a relatively small amount (e.g., 90 ppm) of Mn atoms can poison the graphite electrode and prevent reversible electrode operation, thereby reducing the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge-discharge cycling).

The shuttling of lithium-polysulfide intermediates to the negative electrode in the lithium-sulfur battery or the poisoning of the lithium ion battery by transition metals dissolving from the positive electrode may be reduced or prevented using the battery separator disclosed herein. The examples of the separator include a porous polymer membrane, a porous carbon coating, and a polycation present in the coating and/or in the membrane (where the presence in the membrane depends, at least in part, on the polycation molecular weight). The porous carbon coating may mitigate or prevent the shuttling of lithium-polysulfide intermediates in the lithium-sulfur battery or the migration of transition metal cations in the lithium ion battery by a variety of mechanisms. For one example, the porous carbon coating may absorb the lithium-polysulfide intermediates. For another example, soft acid-soft base interaction may take place between the polycation (i.e., the soft acid) and lithium-polysulfide intermediates (i.e., the soft base). For yet a further example, the polycations may fill at least some of the pores of the membrane and/or coating, thereby further contributing to the mitigation or prevention of the shuttling of the lithium-polysulfide intermediates in the lithium-sulfur battery. In yet a further example, the presence of the polycation present in the coating and/or in the membrane may repel the transition metal cation(s) and thus prevent them from migrating through to the negative electrode. The reduction or the elimination of lithium-polysulfide intermediate migration in the lithium-sulfur battery leads to higher sulfur utilization and enhanced lithium-sulfur battery cycleability and overall performance. Similarly, the reduction or elimination of transition metal cation migration in the lithium ion battery leads to higher graphite, silicon, or other anode material utilization and enhanced lithium ion battery cycleability and overall performance.

Figure 2:
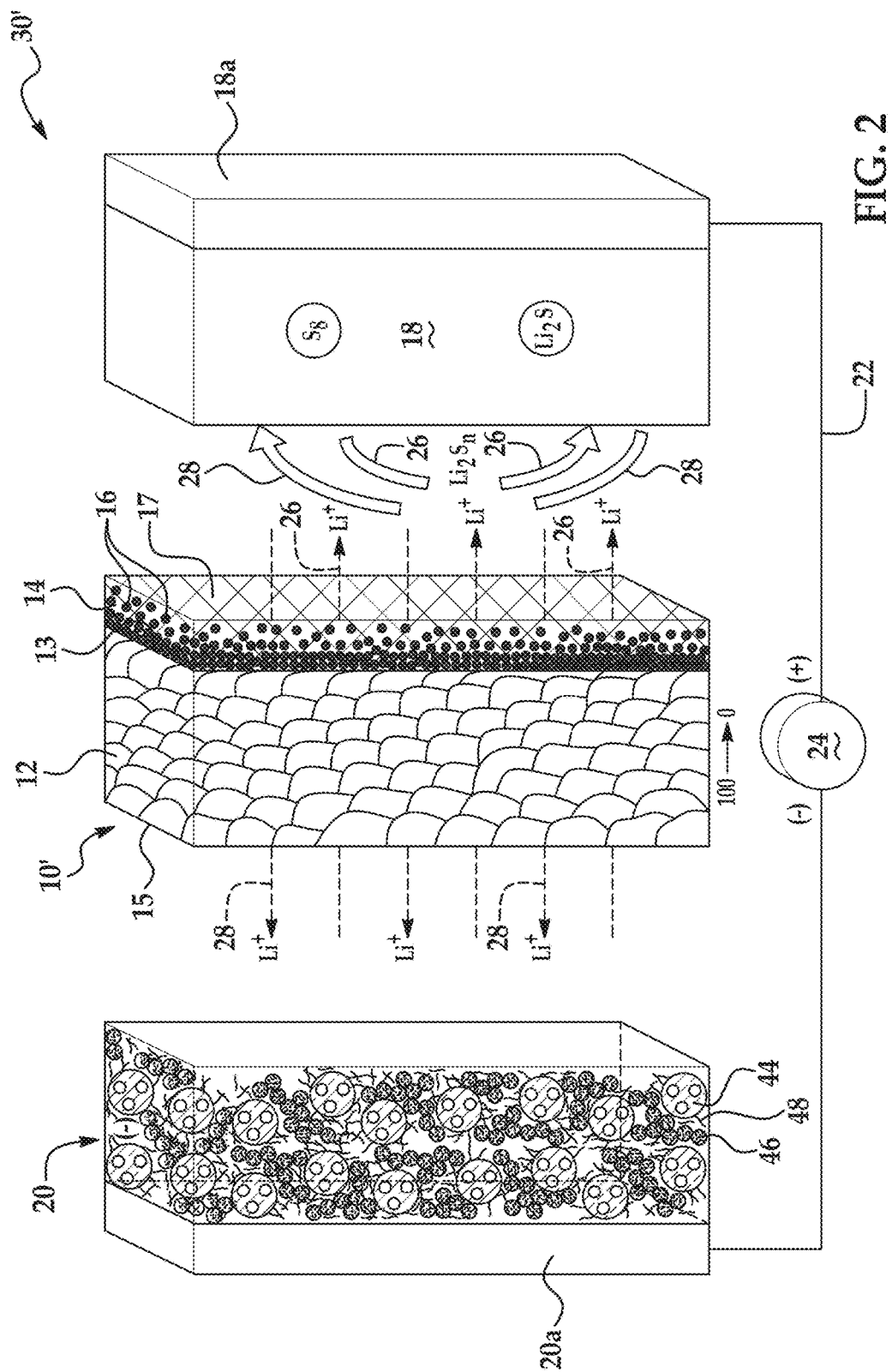
FIG. 2 is a schematic, perspective view of another example of the lithium-sulfur battery showing a charging and discharging state, the battery including another example of the separator according to the present disclosure.

Referring now to FIGS. 1 and 2, two examples of the lithium-sulfur battery 30, 30' are depicted. The examples of the lithium-sulfur battery 30, 30' shown, respectively, in FIGS. 1 and 2 include different examples of the lithium-sulfur battery separator 10, 10' disclosed herein.

The separators 10, 10' disclosed herein include the porous polymer membrane 12 having two opposed surfaces 13, 15, the porous carbon coating 14 formed on one of the opposed surfaces 13, and the polycation(s) 16 present in the membrane 12 (as shown in FIG. 1) or in the coating 14 (as shown in FIG. 2). While not shown, it is to be understood that in still another example, the polycation(s) 16 may be present in both the membrane 12 and the coating 14.

The porous polymer membrane 12 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous polymer membranes 12 include single layer polypropylene membranes, such as CELGARD 2400 and CELGARD 2500 from Celgard, LLC (Charlotte, N.C.). It is to be understood that the porous polymer membrane 12 may be coated or treated, or uncoated or untreated. For example, the porous polymer membrane 12 may or may not include any surfactant treatment thereon.

In other examples, the porous polymer membrane 12 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous polymer membrane 12 is poly(p-hydroxybenzoic acid). In yet another example, the porous polymer membrane 12 may be chosen from a combination of the polyolefin (such as PE and/or PP) and one or more of the other polymers listed above.

The porous polymer membrane 12 may be a single layer or may be a multi-layer (e.g., bilayer, trilayer, etc.) laminate fabricated from either a dry or wet process. For example, a single layer of the polyolefin and/or other listed polymer may constitute the entirety of the porous polymer membrane 12. As another example, however, multiple discrete layers of similar or dissimilar polyolefins and/or polymers may be assembled into the porous polymer membrane 12. In one example, a discrete layer of one or more of the polymers may be coated on a discrete layer of the polyolefin to form the porous polymer membrane 12. Further, the polyolefin (and/or other polymer) layer, and any other optional polymer layers, may further be included in the porous polymer membrane 12 as a fibrous layer to help provide the porous polymer membrane 12 with appropriate structural and porosity characteristics. Still other suitable porous polymer membranes 12 include those that have a ceramic layer attached thereto (positioned between the remainder of the membrane 12 and the porous carbon coating 14), and those that have ceramic filler in the polymer matrix (i.e., an organic-inorganic composite matrix).

The porous carbon coating 14 is formed on one surface 13 of the porous polymer membrane 12. As illustrated in both FIGS. 1 and 2, this surface 13 is the surface 13 or 15 that faces (or will face) the positive electrode 18 when incorporated into the lithium-sulfur battery 30, 30'.

The polycation(s) 16 penetrate into at least some of the pores of the porous polymer membrane 12 and/or the porous carbon coating 14. As schematically illustrated in FIGS. 1 and 2, the polycation(s) 16 may have a gradient distribution through the membrane 12 (FIG. 1) and/or the coating 14 (FIG. 2). By "gradient distribution", it is meant that the concentration of the polycation(s) 16 is the highest at an area of the porous polymer membrane 12 and/or the porous carbon coating 14 that faces or is to face the negative electrode 20, and decreases across the porous polymer membrane 12 and/or the porous carbon coating 14 in the direction of an area that faces or is to face the positive electrode 18. In the example shown in FIG. 1, the gradient distribution (100→0) decreases moving from the surface 15 to the surface 13. Similarly, in the example shown in FIG. 2, the gradient distribution (100→0) decreases moving from the surface 13 to an exterior surface 17 of the porous carbon coating 14. When the polycation(s) 16 are present in both the porous polymer membrane 12 and the porous carbon coating 14, the gradient distribution may decrease moving from the surface 15 of the porous polymer membrane 12 to the exterior surface 17 of the porous carbon coating 14.

The gradient distribution of the polycation(s) 16 may be formed during the formation of the porous carbon coating 14 on the porous polymer membrane 12. This process will now be described.

Both the gradient distribution of the polycation(s) 16 and the porous carbon coating 14 may be formed using a slurry. The slurry includes porous carbon particles and a polycation solution.

The porous carbon particles used in the slurry may be formed by exposing a carbon precursor to a predetermined temperature in an inert atmosphere (e.g., argon gas, nitrogen gas, etc.). This process carbonizes the carbon precursor to form the porous carbon particles having a pore volume ranging from about 5 cc/g to about 6 cc/g. In an example, porous carbon having a pore volume of about 5.68 cc/g is obtained using metal-organic framework-5 (MOF-5) as the carbon precursor and about 1000° C. as the predetermined temperature. As other examples, the carbon precursor may be Al-PCP (Al(OH)(1,4-naphthalenedicarboxylate) or ZIF-8 (Zn(2-methylimidazolate)2). In general, the carbonization temperature may range from about 800° C. to about 1200° C.

The porous carbon particles used in the slurry may also be commercially available carbons. Examples include activated carbon, such as AX-21 or XE-2, and mesoporous carbon, such as cmk-3 or cmk-8.

The polycation solution used in the slurry may include an organic solvent and the polycation(s) 16. In one example, the polycation solution includes N-methyl-2-pyrrolidone (NMP) as the organic solvent, and polyethyleneimine-(trifluoromethane sulfonyl)imide (PEI-TFSI) as the polycation 16. Other examples of the organic solvent include dimethylformamide (DMF), methanol, etc. It is to be understood, however, that the organic solvent selected may depend upon the solubility of the selected polycation. Other examples of the polycation 16 include poly(diallyldimethylammonium chloride) with the chlorine (Cl) replaced by TFSI or poly(acrylamide-co-diallyldimethylammonium chloride) (AMAC) with the chlorine (Cl) replaced by TFSI.

The polycation solution including NMP and PEI-TFSI may be formed by first titrating a polyethyleneimine (PEI) aqueous solution to a pH of 7 using a bis(trifluoromethane sulfonyl)imide (HTFSI) methanol solution. This forms the PEI-TFSI product in water and methanol. The reaction of PEI and HTFSI is shown below:

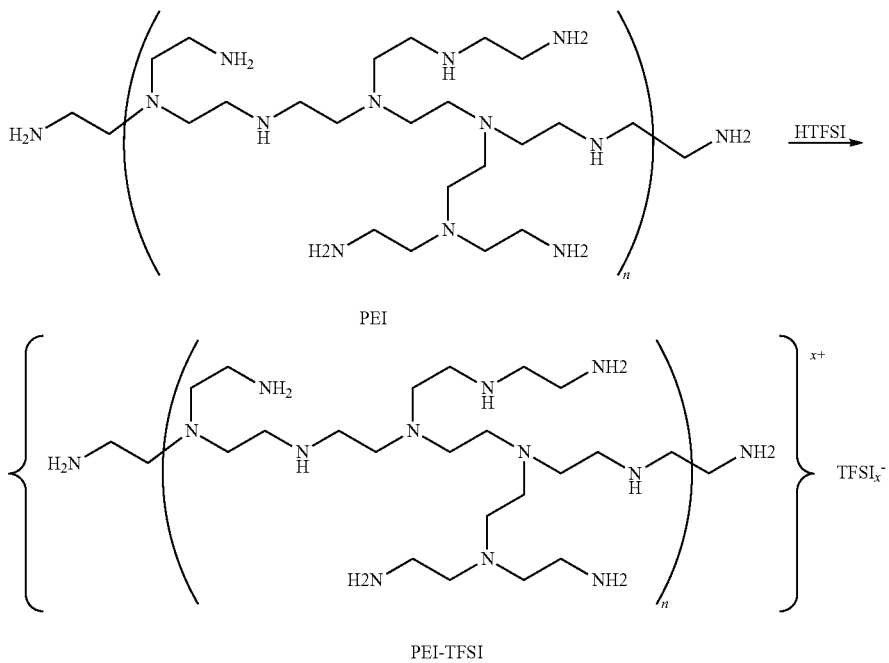

wherein $TFSI_x^-$ is a bis(trifluoromethyl sulfonyl)imide anion, x ranges from 100 to 100,000, and n ranges from 100 to 100,000. It is to be understood that the value of x depends upon the number average molecular weight of the polyethyleneimine that is used.

The water and methanol may be removed from the solution using a vacuum or evaporator. The liquid removal process leaves the PEI-TFSI product, which can be dissolved into the desired organic solvent. Generally, the amount of PEI-TFSI product to organic solvent renders a polycation solution having about 20 wt % of the polycation 16.

To form the slurry, the porous carbon particles may be added to the polycation solution, or the polycation solution may be added to the porous carbon particles. In an example, the ratio of carbon to polycation solution in the slurry ranges from about 5% to about 50%.

The slurry may then be deposited on the porous polymer membrane 12 using any suitable technique. As examples, the slurry may be cast on the surface 13 of the porous polymer membrane 12, or may be spread on the surface 13 of the porous polymer membrane 12, or may be coated on the surface 13 of the porous polymer membrane 12 using a slot die coater.

The deposited slurry may then be exposed to a drying process. The drying process forms i) the porous carbon coating 14 on the surface 13, and ii) the gradient distribution of the polycation(s) 16. During drying, the polycation(s) 16 move to form the gradient. As such, the gradient distribution that is formed may depend, at least in part, on the drying rate. Generally, drying may take place at a temperature ranging from about 25° C. to about 65° C. for a time ranging from about 12 hours to about 48 hours. In an example, the drying process is carried out at about 25° C. for about 24 hours. In an example, the higher the temperature used during the drying process, the smaller the concentration gradient of the polycation(s) 16 will be from the porous carbon coating 14 to the polymer membrane 12.

Whether the polycation(s) 16 penetrate the porous polymer membrane 12, the porous carbon coating 14, or both 12 and 14 depends, at least in part, upon the molecular size of the polycation(s) 16 and the size of the pores of the porous polymer membrane 12.

When the pores of the porous polymer membrane 12 are larger than the molecular size of the polycation(s) 16, the polycations 16 can penetrate into the membrane 12 during drying, as shown in FIG. 1. If the drying process is performed at a low enough temperature and/or a long enough time and the polycations 16 are smaller than the pores of the membrane 12, all of the polycation(s) 16 will migrate from the formed porous carbon coating 14 into the porous polymer membrane 12. However, the drying process can be controlled so that polycation migration stops before all of the polycation(s) 16 are moved into the porous polymer membrane 12. In these instances, the polycation gradient distribution may extend through at least part of the porous polymer membrane 12 and at least part of the porous carbon coating 14. In an example, the molecular size of the polycation(s) 16 may be controlled by selecting a specific molecular weight of the polycation(s) 16. Polycations 16 with a smaller molecular weight can move through a variety of membrane pore sizes, and allow the polycation(s) 16 to penetrate into the membrane 12 during drying, as shown in FIG. 1.

When the pores of the porous polymer membrane 12 are smaller than the molecular size of the polycation(s) 16, the polycations 16 cannot penetrate the membrane 12 during drying. In these instances, the polycation(s) 16 migrate toward the surface 13 of the porous polymer membrane 12 within the porous carbon coating 14. This results in the gradient distribution forming in the porous carbon coating 14, as shown in FIG. 2. In an example, the gradient shown in FIG. 2 may be achieved by selecting a large molecular weight polycation(s) 16, thereby preventing the polycation(s) 16 from penetrating the membrane 12 during drying.

When the polycation(s) 16 are located at or near the interface between the surface 13 of the porous polymer membrane 12 and the porous carbon coating 14, the polycation(s) 16 can serve as a binder for the porous carbon coating 14.

As illustrated in both FIGS. 1 and 2, the separators 10, 10' are positioned between the positive electrode 18 and the negative electrode 20 so that the porous carbon coating 14 faces the positive electrode 18. The separators 10, 10' respectively operate as an electrical insulator (preventing the occurrence of a short), a mechanical support, and a barrier to prevent physical contact between the two electrodes 18, 20. The separators 10, 10' also ensure passage of lithium ions (identified by the Li$^+$) through an electrolyte filling its pores. However, as discussed above, the separators 10, 10' also block the passage of polysulfide intermediates through absorption in the porous carbon coating 14, soft acid-soft base interaction between the polycation 16 and polysulfide intermediates, and/or and the polycation(s) 16 filling at least some of the pores of the membrane 12 and/or coating 14.

The positive electrode 18 of the lithium-sulfur battery 30, 30' may be formed from any sulfur-based active material that can sufficiently undergo lithium intercalation and deintercalation while functioning as the positive terminal of the battery 30, 30'. Examples of sulfur-based active materials include $S_8$, $Li_2S_8$, $Li_2S_6$, $Li_2S_4$, $Li_2S_3$, $Li_2S_2$, and $Li_2S$. Another example of the sulfur-based active material includes a sulfur-carbon composite. In an example, the weight ratio of S to C in the sulfur-carbon composite ranges from 1:9 to 8:1.

The positive electrode 18 may also include a polymer binder material to structurally hold the sulfur-based active material together. The polymer binder material may be made of at least one of polyvinylidene fluoride (PVdF), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyvinyl alcohol (PVA), polyimide, poly(acrylamide-co-diallyl dimethyl ammonium chloride), polyethylene oxide (PEO), or sodium alginate or other water-soluble binders. Still further, the positive electrode 18 may include a conductive carbon material. In an example, the conductive carbon material is a high surface area carbon, such as acetylene black (i.e., carbon black). Other examples of suitable conductive fillers, which may be used alone or in combination with carbon black, include graphene, graphite, carbon nanotubes, and/or carbon nanofibers. One specific example of a combination of conductive fillers is carbon black and carbon nanofibers.

The positive electrode 18 may include from about 40% by weight to about 90% by weight (i.e., 90 wt %) of the sulfur-based active material. The positive electrode 18 may include from 0% by weight to about 30% by weight of the conductive filler. Additionally, the positive electrode 18 may include from 0% by weight to about 20% by weight of the polymer binder. In an example, the positive electrode 18 includes about 85 wt % of the sulfur-based active material, about 10 wt % of the conductive carbon material, and about 5 wt % of the binder.

The negative electrode 20 of the lithium-sulfur battery 30, 30' may include any lithium host material 44 that can sufficiently undergo lithium plating and stripping while functioning as the negative terminal of the lithium-sulfur battery 30, 30'. Examples of the negative electrode lithium host material (i.e., active material) 44 include graphite or a low surface area amorphous carbon. Graphite is widely utilized as the lithium host material because it exhibits reversible lithium intercalation and deintercalation characteristics, is relatively non-reactive, and can store lithium in quantities that produce a relatively high energy density. Commercial forms of graphite that may be used to fabricate the negative electrode 20 are available from, for example, Timcal Graphite & Carbon (Bodio, Switzerland), Lonza Group (Basel, Switzerland), or Superior Graphite (Chicago, Ill.). Other materials can also be used to form the lithium host material 44 of the negative electrode 20, such as, for example, lithium titanate, silicon or silicon-carbon composites, tin oxide, or lithiated silicon (e.g., $LiSi_x$). Porous silicon is shown as the lithium host material in FIGS. 1 and 2.

The negative electrode 20 may also include a polymer binder material 48 to structurally hold the lithium host material together. Example binders include polyvinylidene fluoride (PVdF), an ethylene propylene diene monomer (EPDM) rubber, sodium alginate, styrene-butadiene rubber (SBR), styrene-butadiene rubber carboxymethyl cellulose (SBR-CMC), polyacrylic acid (PAA), cross-linked polyacrylic acid-polyethylenimine, polyvinyl alcohol (PVA), polyimide, poly(acrylamide-co-diallyl dimethyl ammonium chloride), polyethylene oxide (PEO), or carboxymethyl cellulose (CMC). These negative electrode materials may also be mixed with a high surface area carbon, such as acetylene black (i.e., carbon black) or another conductive filler 46. Other examples of suitable conductive fillers 46, which may be used alone or in combination with carbon black, include graphene, graphite, carbon nanotubes, and/or carbon nanofibers. One specific example of a combination of conductive fillers is carbon black and carbon nanofibers. The conductive filler 46 may be used to ensure electron conduction between the negative electrode lithium host material 44 and, for example, a negative-side current collector 20a.

As shown in FIGS. 1 and 2, the lithium-sulfur battery 30, 30' may also include a positive-side current collector 18a and the previously mentioned negative-side current collector 20a positioned in contact with the positive electrode 18 and the negative electrode 20, respectively, to collect and move free electrons to and from an external circuit 22. The positive-side current collector 18a may be formed from aluminum or any other appropriate electrically conductive material known to skilled artisans. The negative-side current collector 20a may be formed from copper or any other appropriate electrically conductive material known to skilled artisans.

Each of the positive electrode 18, the negative electrode 20, and the separator 10, 10' is soaked in an electrolyte solution. Any appropriate electrolyte solution that can conduct lithium ions between the negative electrode 20 and the positive electrode 18 may be used in the lithium-sulfur battery 30, 30'. In one example, the non-aqueous electrolyte solution may be an ether based electrolyte that is stabilized with lithium nitrite. Other non-aqueous liquid electrolyte solutions may include a lithium salt dissolved in an organic solvent or a mixture of organic solvents. Examples of lithium salts that may be dissolved in the ether to form the non-aqueous liquid electrolyte solution include $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiPF_4(C_2O_4)$ (LiFOP), $LiNO_3$, and mixtures thereof. The ether based solvents may be composed of cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof.

The lithium-sulfur battery 30, 30' also includes the interruptible external circuit 22 that connects the positive electrode 18 and the negative electrode 20. The lithium-sulfur battery 30, 30' may also support a load device 24 that can be operatively connected to the external circuit 22. The load device 24 receives a feed of electrical energy from the electric current passing through the external circuit 22 when the lithium-sulfur battery 30, 30' is discharging. While the load device 24 may be any number of known electrically-powered devices, a few specific examples of a power-consuming load device include an electric motor for a hybrid vehicle or an all-electrical vehicle, a laptop computer, a cellular phone, and a cordless power tool. The load device 24 may also, however, be a power-generating apparatus that charges the lithium-sulfur battery 30, 30' for purposes of storing energy. For instance, the tendency of windmills and solar panels to variably and/or intermittently generate electricity often results in a need to store surplus energy for later use.

The lithium-sulfur battery 30, 30' can include a wide range of other components that, while not depicted here, are nonetheless known to skilled artisans. For instance, the lithium-sulfur battery 30, 30' may include a casing, gaskets, terminals, tabs, and any other desirable components or materials that may be situated between or around the positive electrode 18 and the negative electrode 20 for performance-related or other practical purposes. Moreover, the size and shape of the lithium-sulfur battery 30, 30', as well as the design and chemical make-up of its main components, may vary depending on the particular application for which it is designed. Battery-powered automobiles and hand-held consumer electronic devices, for example, are two instances where the lithium-sulfur battery 30, 30' would most likely be designed to different size, capacity, and power-output specifications. The lithium-sulfur battery 30, 30' may also be connected in series and/or in parallel with other similar lithium-sulfur batteries 30, 30' to produce a greater voltage output and current (if arranged in parallel) or voltage (if arranged in series) if the load device 24 so requires.

The lithium-sulfur battery 30, 30' can generate a useful electric current during battery discharge (shown by reference numeral 26 in FIGS. 1 and 2). During discharge, the chemical processes in the battery 30, 30' include lithium ($Li^+$) dissolution from the surface of the negative electrode 20 and incorporation of the lithium cations into alkali metal polysulfide salts (i.e., $Li_2S_n$, such as $Li_2S_8$, $Li_2S_6$, $Li_2S_4$, $Li_2S_2$, and $Li_2S$) in the positive electrode 18. As such, polysulfides are formed (sulfur is reduced) within the positive electrode 18 in sequence while the battery 30, 30' is discharging. The chemical potential difference between the positive electrode 18 and the negative electrode 20 (ranging from approximately 1.5 to 3.0 volts, depending on the exact chemical make-up of the electrodes 18, 20) drives electrons produced by the dissolution of lithium at the negative electrode 20 through the external circuit 22 towards the positive electrode 18. The resulting electric current passing through the external circuit 22 can be harnessed and directed through the load device 24 until the lithium in the negative electrode 20 is depleted and the capacity of the lithium-sulfur battery 30, 30' is diminished.

The lithium-sulfur battery 30, 30' can be charged or re-powered at any time by applying an external power source to the lithium-sulfur battery 30, 30' to reverse the electrochemical reactions that occur during battery discharge. During charging (shown at reference numeral 28 in FIGS. 1 and 2), lithium plating to the negative electrode 20 takes place and sulfur formation within the positive electrode 18 takes place. The connection of an external power source to the lithium-sulfur battery 30, 30' compels the otherwise non-spontaneous oxidation of lithium at the positive electrode 18 to produce electrons and lithium ions. The electrons, which flow back towards the negative electrode 20 through the external circuit 22, and the lithium ions ($Li^+$), which are carried by the electrolyte across the separator 10, 10' back towards the negative electrode 20, reunite at the negative electrode 20 and replenish it with lithium for consumption during the next battery discharge cycle. The external power source that may be used to charge the lithium-sulfur battery 30, 30' may vary depending on the size, construction, and particular end-use of the lithium-sulfur battery 30, 30'. Some suitable external power sources include a battery charger plugged into an AC wall outlet and a motor vehicle alternator.

Figure 3:
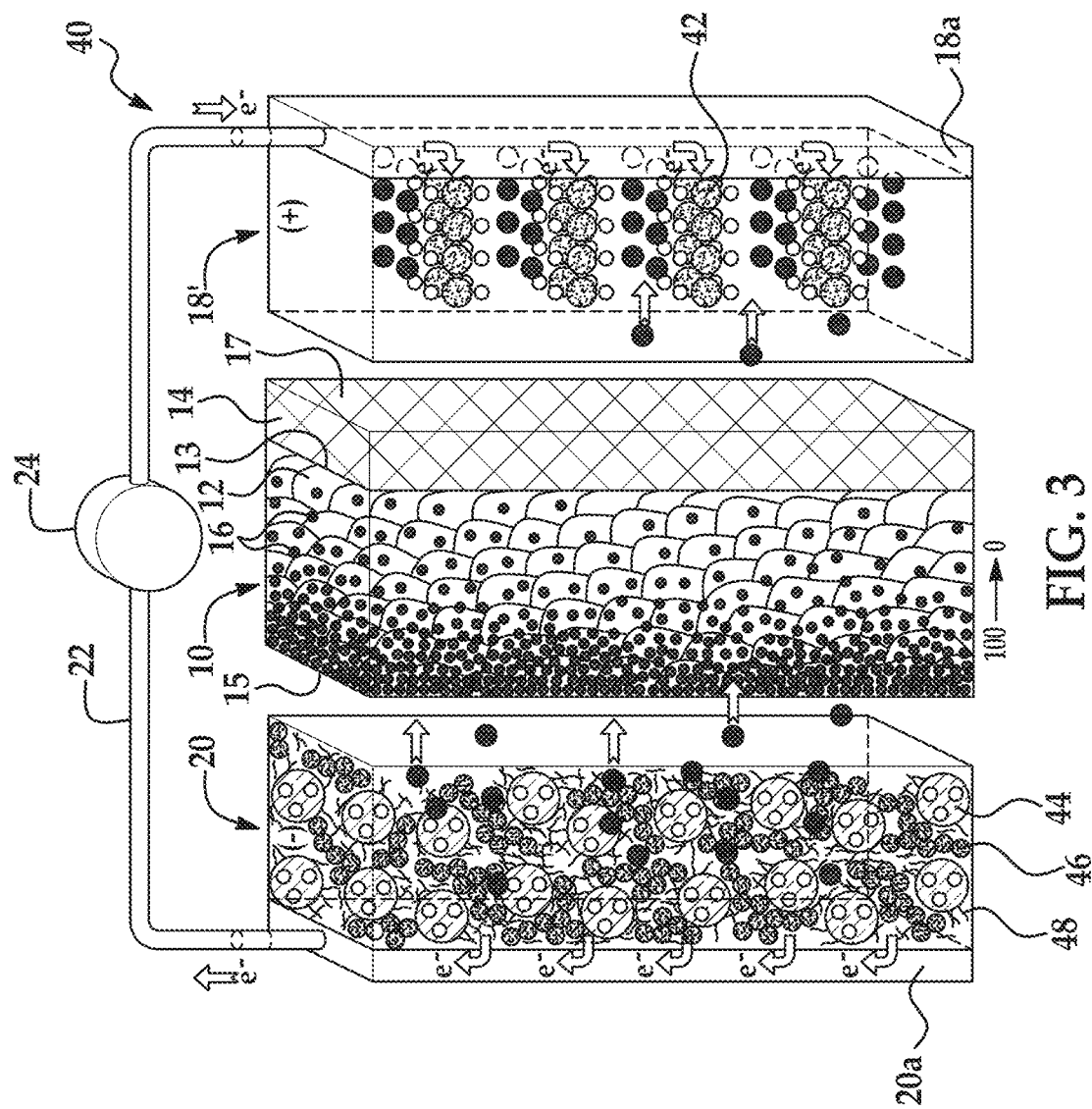
FIG. 3 is a schematic, perspective view of one example of a lithium ion battery showing a discharging state, the battery including one example of the separator according to the present disclosure.
Figure 4:
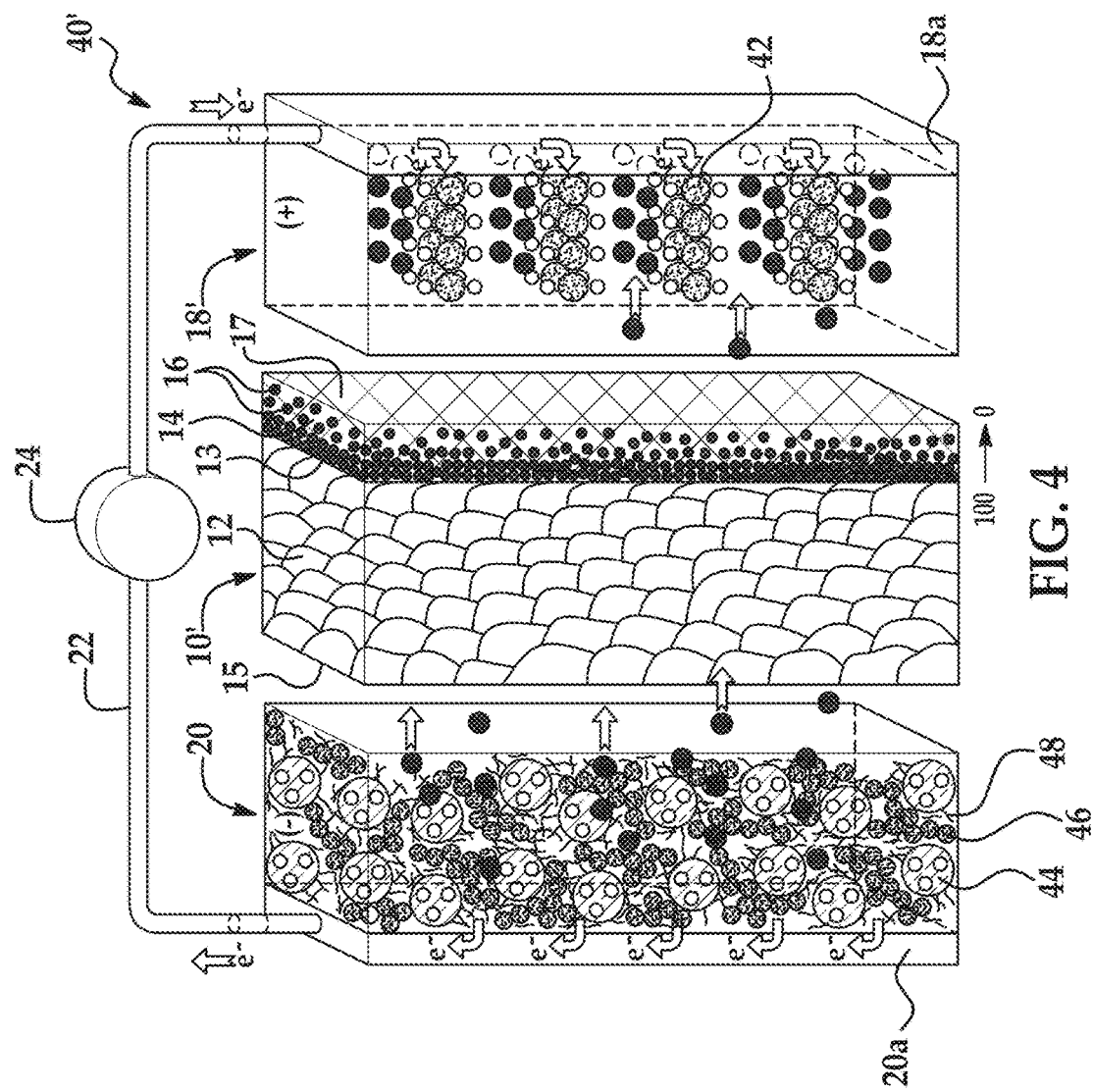
FIG. 4 is a schematic, perspective view of another example of a lithium ion battery showing a discharging state, the battery including another example of the separator according to the present disclosure.

In FIGS. 3 and 4, the lithium ion battery 40, 40' contains the negative electrode 20, the negative side current collector 20a, a positive electrode 18', the positive-side current collector 18a, and the separator 10, 10' positioned between the negative electrode 20 and the positive electrode 18'. It is to be understood that the separator 10 shown in FIG. 3 and the separator 10' shown in FIG. 4 may be the same type of porous separators 10, 10 that are described in reference to FIGS. 1 and 2, respectively. In addition, the negative current collector 20a and positive current collector 18a described herein for the lithium-sulfur battery 30, 30' may also be used in the lithium ion battery 40, 40'.

As illustrated in both FIGS. 3 and 4, the separators 10, 10' are positioned between the positive electrode 18' and the negative electrode 20 so that the porous carbon coating 14 faces the positive electrode 18'. The separators 10, 10' respectively operate as an electrical insulator (preventing the occurrence of a short), a mechanical support, and a barrier to prevent physical contact between the two electrodes 18', 20. The separators 10, 10' also ensure passage of lithium ions (identified by the $Li^+$) through an electrolyte filling its pores. However, as discussed above, the separators 10, 10' include positively charged polycation(s) 16, which may repel the positively charged transition metal cations, and thus may block the passage of the transition metal cations across the separators 10, 10'.

In FIGS. 3 and 4, the positive electrode 18' may be formed from any lithium-based active material 42 that can sufficiently undergo lithium insertion and deinsertion while aluminum or another suitable current collector is functioning as the positive terminal of the lithium ion battery 40, 40'. One common class of known lithium-based active materials 42 suitable for the positive electrode 18' includes layered lithium transitional metal oxides. Some specific examples of the lithium-based active materials 42 include spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$ or $Li(Ni_xMn_yCo_z)O_4$, or a lithium iron polyanion oxide, such as lithium iron phosphate ($LiFePO_4$) or lithium iron fluorophosphate ($Li_2FePO_4F$). Other lithium-based active materials 42 may also be utilized, such as $LiNi_xM_{1-x}O_2$ (M is composed of any ratio of Al, Co, and/or Mg), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), $xLi_2MnO_3$-(1-x)$LiMO_2$ (M is composed of any ratio of Ni, Mn and/or Co), and any other high efficiency nickel-manganese-cobalt material. By "any ratio" it is meant that any element may be present in any amount. So, for example M could be Al, with or without Co and/or Mg, or any other combination of the listed elements.

The lithium-based active material 42 of the positive electrode 18' may be intermingled with a polymeric binder and a conductive filler (e.g., high surface area carbon) (neither of which is shown). Any of the binders previously described for the negative electrode 20 of the lithium-sulfur battery 30, 30' may be used in the positive electrode 18' of the lithium ion battery 40, 40'. The polymeric binder structurally holds the lithium-based active materials and the high surface area carbon together. An example of the high surface area carbon is acetylene black. The high surface area carbon ensures electron conduction between the positive-side current collector 18a and the active material particles of the positive electrode 18'.

The negative electrode 20 of the lithium ion battery 40, 40' may include any lithium host material 44 that can sufficiently undergo lithium intercalation and deintercalation while copper or another suitable current collector 18a functions as the negative terminal of the lithium ion battery 40, 40'. Any of the lithium host materials (i.e., active materials) previously described for the negative electrode 20 of the lithium-sulfur battery 30, 30' may be used in the negative electrode 20 of the lithium ion battery 40, 40'. For example, the negative electrode lithium host material may be graphite or a silicon-based material. In FIGS. 3 and 4, a porous silicon is shown as the lithium host material 33.

The lithium-based active material of the negative electrode 20 may be intermingled with a polymeric binder 48 and a conductive filler 44 (e.g., high surface area carbon). Any of the binders previously described for the negative electrode 20 of the lithium-sulfur battery 30, 30' may be used in the negative electrode 20 of the lithium ion battery 40, 40'.

Any appropriate electrolyte solution that can conduct lithium ions between the negative electrode 20 and the positive electrode 18' may be used in the lithium ion battery 40, 40'. Each of the positive electrode 18', the negative electrode 20, and the separator 10, 10' is soaked in an electrolyte solution. In one example, the electrolyte solution may be a non-aqueous liquid electrolyte solution that includes a lithium salt dissolved in an organic solvent or a mixture of organic solvents. Examples of lithium salts that may be dissolved in an organic solvent to form the non-aqueous liquid electrolyte solution include $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiPF_4(C_2O_4)$ (LiFOP), $LiNO_3$, and mixtures thereof. Some examples of the organic based solvent may include cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

As shown in FIGS. 3 and 4, the lithium ion battery 40, 40' also includes an interruptible external circuit 22 that connects the negative electrode 20 and the positive electrode 18'. The lithium ion battery 40, 40' may also support a load device 24 that can be operatively connected to the external circuit 22. The load device 24 receives a feed of electrical energy from the electric current passing through the external circuit 22 when the lithium ion battery 40, 40' is discharging.

While the load device 24 may be any number of known electrically-powered devices, a few specific examples of a power-consuming load device 24 include an electric motor for a hybrid vehicle or an all-electrical vehicle, a laptop computer, a cellular phone, and a cordless power tool. The load device 24 may also, however, be an electrical power-generating apparatus that charges the lithium ion battery 40, 40' for purposes of storing energy. For instance, the tendency of windmills and solar panels to variably and/or intermittently generate electricity often results in a need to store surplus energy for later use.

The lithium ion battery 40, 40' may also include a wide range of other components that, while not depicted here, are nonetheless known to skilled artisans. For instance, the lithium ion battery 40, 40' may include a casing, gaskets, terminals, tabs, and any other desirable components or materials that may be situated between or around the negative electrode 20 and the positive electrode 18' for performance-related or other practical purposes. Moreover, the size and shape of the lithium ion battery 40, 40', as well as the design and chemical make-up of its main components, may vary depending on the particular application for which it is designed. Battery-powered automobiles and hand-held consumer electronic devices, for example, are two instances where the lithium ion battery 40, 40' would most likely be designed to different size, capacity, and power-output specifications. The lithium ion battery 40, 40' may also be connected in series and/or in parallel with other similar lithium ion batteries to produce a greater voltage output and current (if arranged in parallel) or voltage (if arranged in series) if the load device 24 so requires.

The lithium ion battery 40, 40' generally operates by reversibly passing lithium ions between the negative electrode 20 and the positive electrode 18'. In the fully charged state, the voltage of the battery 40, 40' is at a maximum (typically in the range 2.0V to 5.0V); while in the fully discharged state, the voltage of the battery 40, 40' is at a minimum (typically in the range 0V to 2.0V). Essentially, the Fermi energy levels of the active materials in the positive and negative electrodes 18', 20 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 24 enables an electronic current flow in the external circuit 22 with a direction such that the difference between the Fermi levels (and, correspondingly, the cell voltage) decreases. The reverse happens during battery charging: the battery charger forces an electronic current flow in the external circuit 22 with a direction such that the difference between the Fermi levels (and, correspondingly, the cell voltage) increases.

At the beginning of a discharge, the negative electrode 20 of the lithium ion battery 40, 40' contains a high concentration of intercalated lithium while the positive electrode 18' is relatively depleted. When the negative electrode 20 contains a sufficiently higher relative quantity of intercalated lithium, the lithium ion battery 40, 40' can generate a beneficial electric current by way of reversible electrochemical reactions that occur when the external circuit 24 is closed to connect the negative electrode 20 and the positive electrode 18'. The establishment of the closed external circuit under such circumstances causes the extraction of intercalated lithium from the negative electrode 20. The extracted lithium atoms are split into lithium ions (identified by the black dots) and electrons ($e^-$) as they leave an intercalation host at the negative electrode-electrolyte interface.

The chemical potential difference between the positive electrode 18' and the negative electrode 20 (ranging from about 2.0V to about 5.0V, depending on the exact chemical make-up of the electrodes 20, 18') drives the electrons ($e^-$) produced by the oxidation of intercalated lithium at the negative electrode 20 through the external circuit 22 towards the positive electrode 18'. The lithium ions are concurrently carried by the electrolyte solution through the porous separator 10, 10' towards the positive electrode 18'. The electrons ($e^-$) flowing through the external circuit 22 and the lithium ions migrating across the porous separator 10, 10' in the electrolyte solution eventually reconcile and form intercalated lithium at the positive electrode 18'. The electric current passing through the external circuit 22 can be harnessed and directed through the load device 24 until the level of intercalated lithium in the negative electrode 20 falls below a workable level or the need for electrical energy ceases.

The lithium ion battery 40, 40' may be recharged after a partial or full discharge of its available capacity. To charge the lithium ion battery 40, 40' an external battery charger is connected to the positive and the negative electrodes 18', 20 to drive the reverse of battery discharge electrochemical reactions. During recharging, the electrons ($e^-$) flow back towards the negative electrode 20 through the external circuit 22, and the lithium ions are carried by the electrolyte across the porous separator 10, 10' back towards the negative electrode 20. The electrons ($e^-$) and the lithium ions are reunited at the negative electrode 20, thus replenishing it with intercalated lithium for consumption during the next battery discharge cycle.

The external battery charger that may be used to charge the lithium ion battery 40, 40' may vary depending on the size, construction, and particular end-use of the lithium ion battery 40, 40'. Some suitable external battery chargers include a battery charger plugged into an AC wall outlet and a motor vehicle alternator.

Examples of the batteries 30, 30', 40, 40' may be used in a variety of different applications. For example the batteries 30, 30', 40, 40' may be used in different devices, such as a battery operated or hybrid vehicle, a laptop computer, a cellular phone, a cordless power tool, or the like.

To further illustrate the present disclosure, an example is given herein. It is to be understood that this example is provided for illustrative purposes and is not to be construed as limiting the scope of the disclosed example(s).

Example

A separator was prepared with a porous carbon coating and a gradient distribution of PEI-TFSI.

A 10 wt % polyethyleneimine aqueous solution was titrated to a pH of 7 using a 10 wt % bis-(trifluoromethane sulfonyl)imide methanol solution. The PEI-TFSI product was obtained after removing water and methanol though vacuum. The PEI-TFSI product was dissolved into NMP so that a polycation solution with 20 wt % PEI-TFSI was obtained.

Porous carbon with a pore volume of 5.68 cc/g was obtained by heating MOF-5 at 1000° C. in argon.

A slurry was prepared by mixing the porous carbon with the polycation solution. This slurry was cast on a polypropylene membrane (CELGARD 2500) and was dried at room temperature (~25° C.) for about 24 hours. This formed the example separator.

Two comparative porous separators were also used. The first comparative porous separator was an unmodified polypropylene separator (CELGARD 2500).

The second comparative separator was made with a coating of some of the porous carbon described above and polyvinylidene fluoride on a polypropylene separator (CELGARD 2500). More particularly, the second comparative separator was prepared by mixing 20 mg of the porous carbon with 80 mg of PVDF. 200 mg of NMP was added to make a slurry (or suspension) under magnetic stirring for about 12 hours. The slurry was then cast onto the separator (CELGARD 2500). Finally, the second comparative separator was obtained by drying at 25° C. for about 24 hours.

The first comparative example separator (1), the second comparative example separator (2), and the example separator (3) were each evaluated using half cells. Within the half cells, the first comparative example separator (1), the second comparative example separator (2), and the example separator (3) were paired with a sulfur positive electrode having a sulfur loading of 1.85 g/cm$^2$ in 0.6 M LiNO$_3$ plus 0.4 M LiTFSI in dimethoxyethane:1,3-dioxolane (DME:DIOX) 1:1). The galvanostatic cycling performance of the first comparative example separator (1), the second comparative example separator (2), and the example separator (3) was tested by cycling between 1.7V and 2.75V at a rate of C/10 at room temperature for up to 60 cycles.

Figure 5:
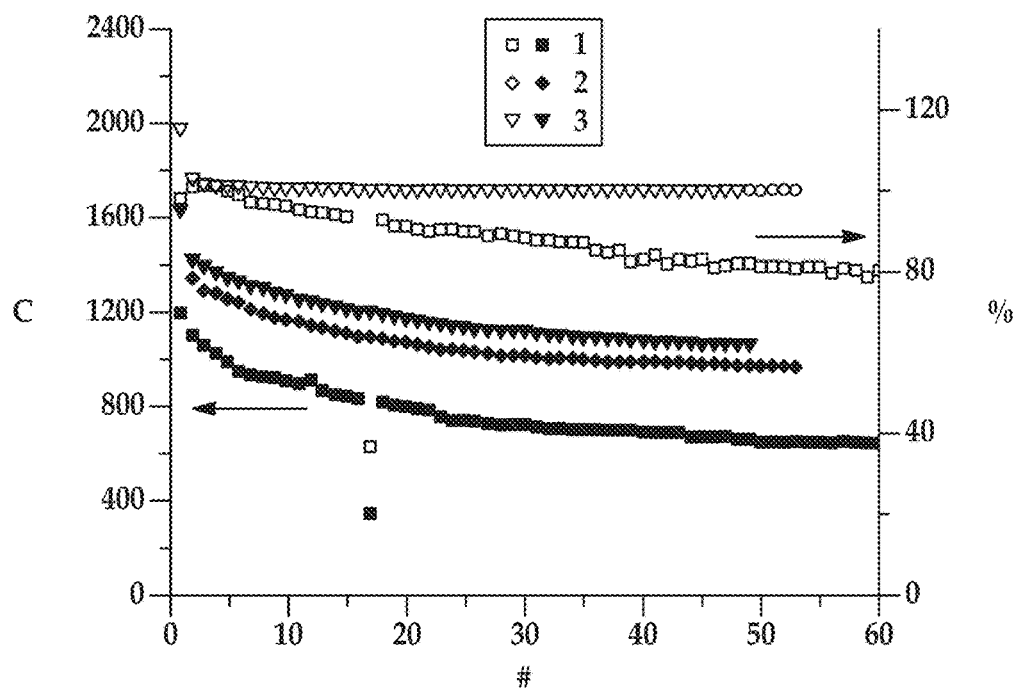
FIG. 5 is a graph illustrating the capacity (mAh/$g_s$, left Y-axis labeled "C") vs. cycle number (X-axis labeled "#") and the Coulombic efficiency (%, right Y-axis labeled "%") vs. cycle number (X-axis labeled "#") for an example lithium-sulfur cell with an example of the lithium-sulfur battery separator disclosed herein, a first comparative lithium-sulfur cell with a first comparative battery separator, and a second comparative lithium-sulfur cell with a second comparative battery separator.

The cycling performance and Coulombic efficiency results are shown in FIG. 5. In particular, the capacity (mAh/g$_s$) is shown on the left Y-axis (labeled "C"), the Coulombic efficiency (%) is shown on the right Y-axis (labeled "%"), and the cycle number is shown on the X-axis (labeled "#"). As noted above, "1" represents the results for the half cell with the first comparative example separator, "2" represents the results for the half cell with the second comparative example separator, and "3" represents the results for the half cell with the example separator. Both the example separator and the second comparative separator (which did include a carbon/polymer coating) improved in capacity and Coulombic efficiency compared to the first comparative example (i.e., the uncoated separator). The capacity results for the example separator were much better than both the first and second comparative electrodes. The Coulombic efficiency for the example separator was much better than the first comparative electrode, and was comparable to the second comparative electrode. Overall, the example separator exhibited the best performance, which may have been due, at least in part, to the soft acid (ammonium)-base (polysulfide) interaction.

Figure 6:
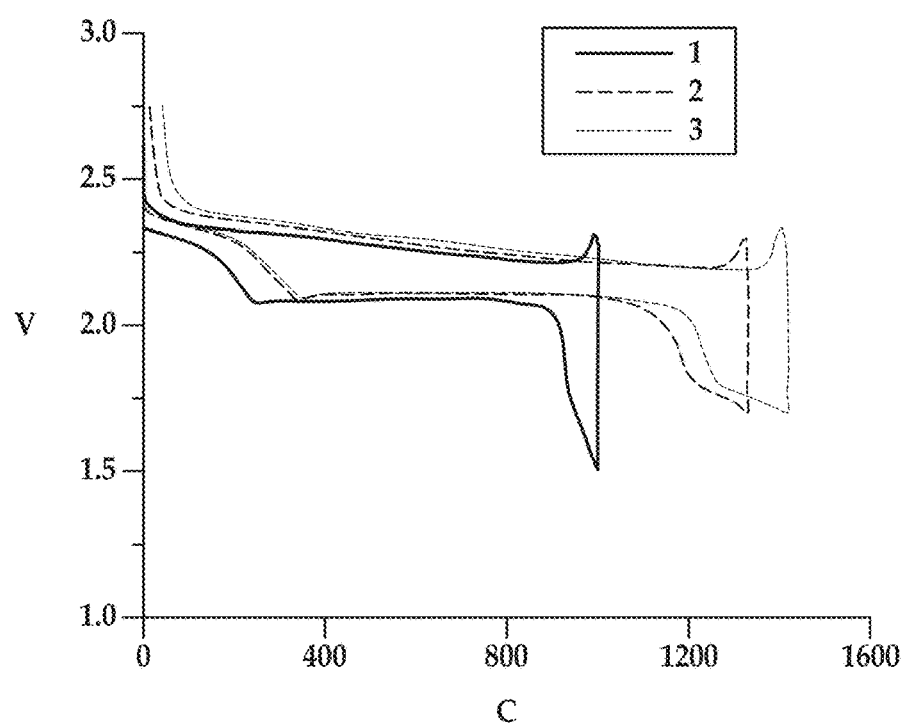
FIG. 6 is a graph illustrating voltage profiles (voltage (V) vs. capacity (C)) for the example lithium-sulfur cell, the first comparative lithium-sulfur cell, and the second comparative lithium-sulfur cell in the second cycle.

FIG. 6 illustrates the voltage profile of the three half cells in the 2$^{nd}$ cycle. In FIG. 6, the voltage (V) is shown on the Y-axis (labeled "V") and the specific capacity (mAh/g$_s$) is shown on the X-axis (labeled "C"). As shown in FIG. 6, the introduction of the polycations maintains the plateau voltage and improved the utilization of the sulfur based active materials. This results in a higher energy density.

Figure 7A:
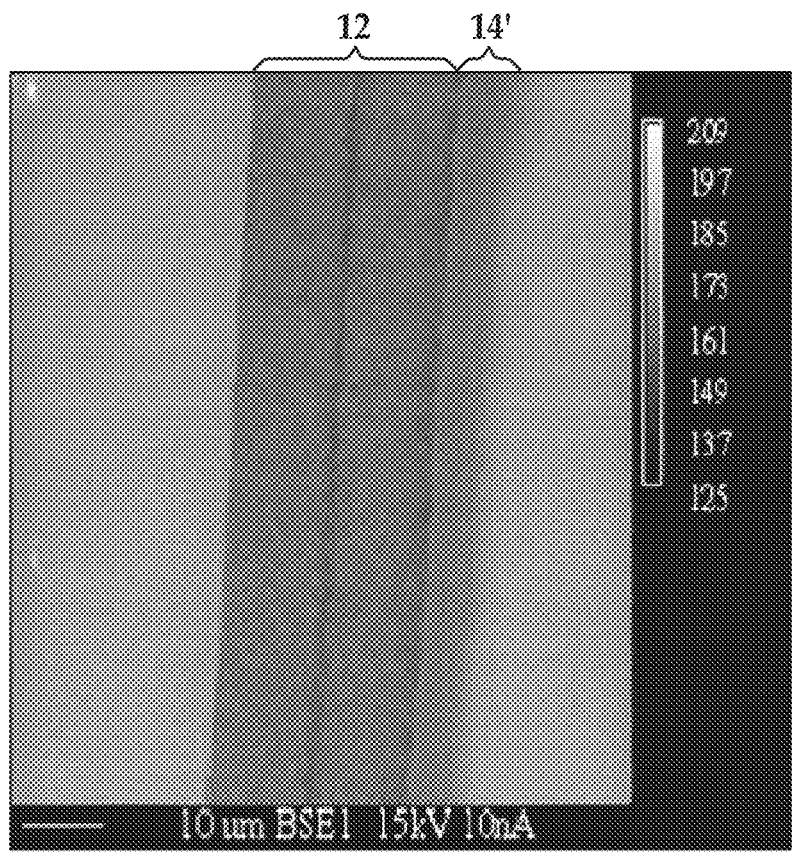
FIG. 7A is a backscatter electron image of the second comparative battery separator.
Figure 7B:
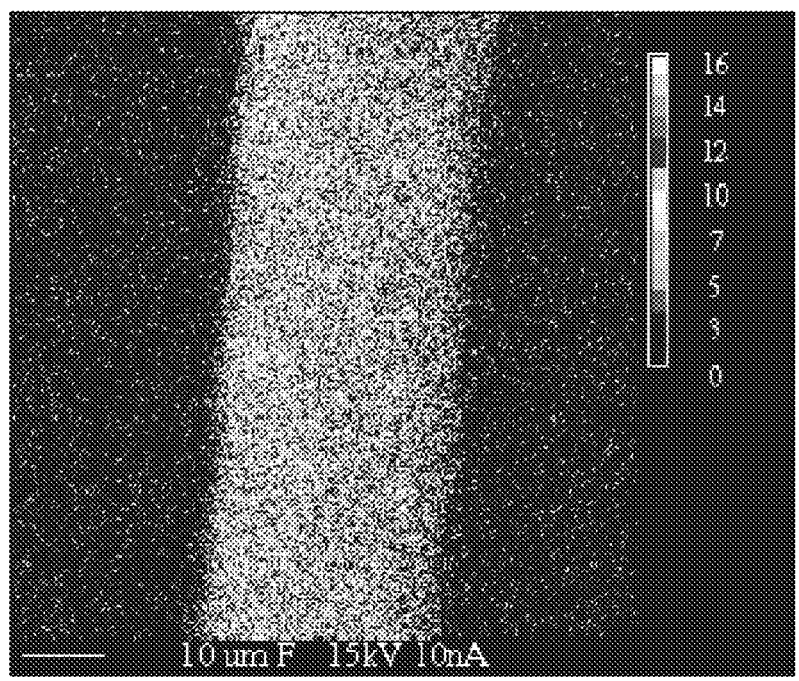
FIG. 7B is a grey scale representation of the elemental mapping of fluorine (F) for the backscatter electron image of FIG. 7A.

A backscatter electron image of the second comparative example was taken and is shown in FIG. 7A. As illustrated, the second comparative example included the CELGARD 2500 membrane (labeled 12) and the carbon/PVDF coating (labeled 14'). In this comparative example, PVDF is the only source of F, and thus the gradient formed in this comparative example can be readily seen through elemental mapping (FIG. 7B). In the example separator, the N signal is very weak from PEI-TFSI. As a result, it is difficult to obtain a similar elemental mapping of F for the example separator. It is believed that the example separator has a similar polycation gradient as the second comparative example, at least in part because the same solvent (i.e., NMP) and drying conditions were used.

It is to be understood that the ranges provided herein include the stated range and any value or sub-range within the stated range. For example, a range of from 100 to 100,000 should be interpreted to include not only the explicitly recited limits of 100 to 100,000, but also to include individual values, such as 225, 3,000, 50,050, etc., and sub-ranges, such as from 500 to about 75,000; from 1,100 to 95,000, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A lithium-based battery separator, consisting of:
   a porous polymer membrane having opposed surfaces;
   a porous carbon coating formed on one of the opposed surfaces of the porous polymer membrane; and either
   polycations and associated anions incorporated in the porous carbon coating and having a gradient distribution that increases toward the one of the opposed surfaces of the porous polymer membrane, or
   polycations and associated anions incorporated in the porous polymer membrane and having a gradient distribution that increases toward an other of the opposed surfaces of the porous polymer membrane.

2. The lithium-based battery separator as defined in claim 1 wherein the polycations and the associated anions have the following structure:

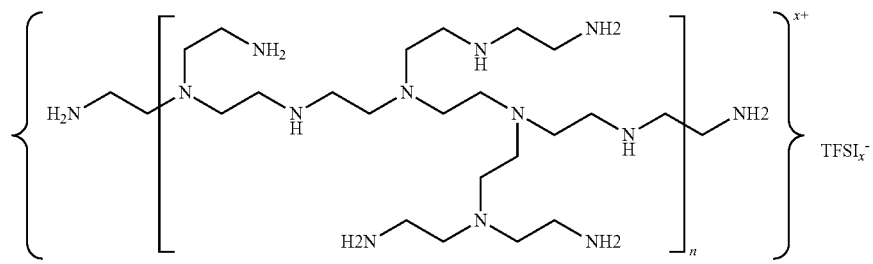

wherein TFSI$_x^-$ is a bis(trifluoromethyl sulfonyl)imide anion, x ranges from 100 to 100,000, and n ranges from 100 to 100,000.

3. The lithium-based battery separator as defined in claim 1 wherein:
the polycations and associated anions are incorporated in the porous polymer membrane and have a gradient distribution that increases towards the other of the opposed surfaces of the porous polymer membrane;
the polycations and the associated anions have the following structure:

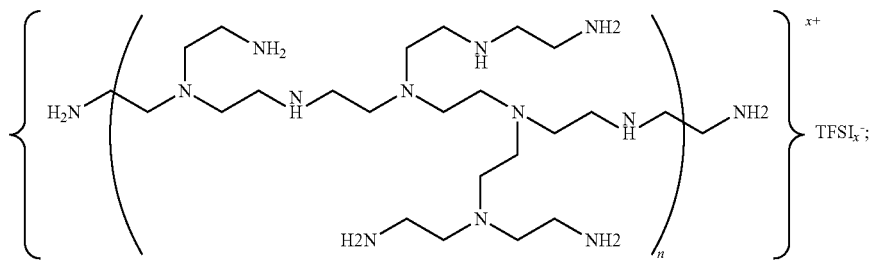

and
TFSI$_x^-$ is a bis(trifluoromethyl sulfonyl)imide anion, x ranges from 100 to 100,000, and n ranges from 100 to 100,000.

4. A lithium-based battery separator, comprising:
a porous polymer membrane having opposed surfaces;
a porous carbon coating formed on one of the opposed surfaces of the porous polymer membrane; and
polycations incorporated in the porous carbon coating, or in both the porous carbon coating and the porous polymer membrane,
wherein the polycations have a gradient distribution within the porous carbon coating that increases towards the one of the opposed surfaces of the porous polymer membrane.

5. A lithium-based battery, comprising:
a negative electrode;
a positive electrode including an active material;
a separator positioned between the negative electrode and the positive electrode, the separator consisting of:
a porous polymer membrane having opposed surfaces, one of the opposed surfaces facing the positive electrode;
a porous carbon coating formed on the one of the opposed surfaces; and either
polycations and associated anions incorporated in the porous carbon coating and having a gradient distribution that increases toward the one of the opposed surfaces of the porous polymer membrane, or
polycations and associated anions incorporated in the porous polymer membrane and having a gradient distribution that increases toward an other of the opposed surfaces of the porous polymer membrane; and an electrolyte solution soaking each of the positive electrode, the negative electrode, and the separator.

6. The lithium-based battery as defined in claim 5 wherein the lithium-based battery is a lithium-sulfur battery.

7. The lithium-based battery as defined in claim 5 wherein the lithium-based battery is a lithium ion battery.

8. The lithium-based battery as defined in claim 5 wherein the polycations and the associated anions have the following structure:

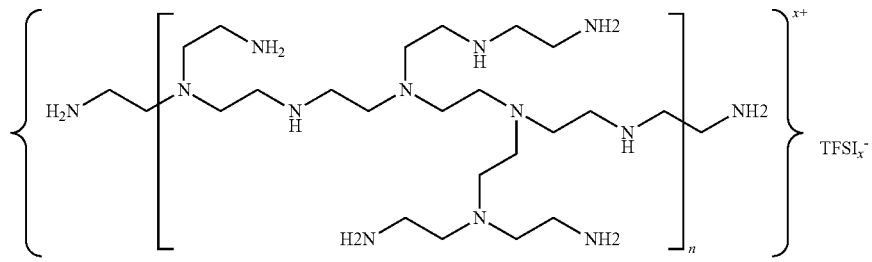

wherein TFSI$_x^-$ is a bis(trifluoromethyl sulfonyl)imide anion, x ranges from 100 to 100,000, and n ranges from 100 to 100,000.

9. The lithium-based battery as defined in claim 5 wherein:

the polycations and associated anions are incorporated in the porous polymer membrane and have a gradient distribution that increases towards the other of the opposed surfaces of the porous polymer membrane;

the polycations and the associated anions have the following structure:

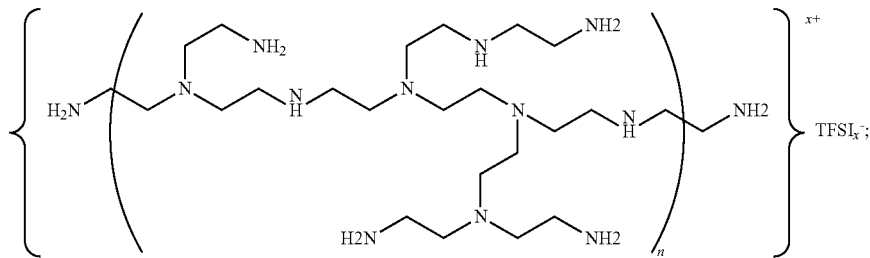

and

TFSI$_x^-$ is a bis(trifluoromethyl sulfonyl)imide anion, x ranges from 100 to 100,000, and n ranges from 100 to 100,000.

10. The lithium-based battery as defined in claim 5, wherein the electrolyte solution comprises a lithium salt selected from the group consisting of LiClO$_4$, LiAlCl$_4$, LiI, LiBr, LiB(C$_2$O$_4$)$_2$ (LiBOB), LiBF$_2$(C$_2$O$_4$) (LiODFB), LiSCN, LiBF$_4$, LiB(C$_6$H$_5$)$_4$, LiAsF$_6$, LiCF$_3$SO$_3$, LiN(FSO$_2$)$_2$ (LIFSI), LiN(CF$_3$SO$_2$)$_2$ (LITFSI), LiPF$_6$, LiPF$_4$(C$_2$O$_4$) (LiFOP), LiNO$_3$, and mixtures thereof.

11. A method for manufacturing a lithium-based battery separator, the method comprising:

casting a slurry on one of two opposed surfaces of a porous polymer membrane, the slurry including porous carbon particles and polycations; and exposing the cast slurry to a drying process, thereby forming i) a porous carbon coating on the one of the two opposed surfaces of the porous polymer membrane, and ii) either a gradient distribution of the polycations in the porous carbon coating that increases toward the one of the two opposed surfaces of the porous polymer membrane or a gradient distribution of the polycations in the porous polymer membrane that increases toward an other of the two opposed surfaces of the porous polymer membrane.

12. The method as defined in claim 11 wherein prior to casting the slurry, the method further comprises making a polycation solution and adding the porous carbon particles to the polycation solution.

13. The method as defined in claim 12, further comprising making the polycation solution by:

titrating a polyethyleneimine aqueous solution to a pH of 7 using a bis(trifluoromethane sulfonyl)imide methanol solution, thereby forming a polycation product in water and methanol;

removing the water and methanol; and dissolving the polycation product in an organic solvent.

14. The method as defined in claim 12, further comprising making the porous carbon particles by exposing a carbon precursor to a predetermined temperature in an inert atmosphere thereby carbonizing the carbon precursor.

15. The method as defined in claim 14 wherein the carbon precursor is metal-organic framework-5 (MOF-5).

16. The method as defined in claim 12 wherein the drying process is performed at about 25° C. for about 24 hours.

* * * * *